(12) United States Patent
Wu et al.

(10) Patent No.: US 7,725,708 B2
(45) Date of Patent: May 25, 2010

(54) METHODS AND SYSTEMS FOR AUTOMATIC DENIAL OF SERVICE PROTECTION IN AN IP DEVICE

(75) Inventors: Ju Wu, Richardson, TX (US); Yen Shei, Plano, TX (US)

(73) Assignee: GENBAND Inc., Plano, TX (US)

( * ) Notice: Subject to any disclaimer, the term of this patent is extended or adjusted under 35 U.S.C. 154(b) by 883 days.

(21) Appl. No.: 11/034,672

(22) Filed: Jan. 13, 2005

(65) Prior Publication Data
US 2006/0077964 A1    Apr. 13, 2006

Related U.S. Application Data

(60) Provisional application No. 60/616,651, filed on Oct. 7, 2004.

(51) Int. Cl.
H04L 29/06 (2006.01)
G06F 9/00 (2006.01)

(52) U.S. Cl. .................... 713/151; 726/13; 370/352

(58) Field of Classification Search ................ 713/151; 726/13; 370/352, 401
See application file for complete search history.

(56) References Cited

U.S. PATENT DOCUMENTS

| 6,687,247 | B1 * | 2/2004 | Wilford et al. ............ 370/392 |
| 7,058,974 | B1 * | 6/2006 | Maher et al. ................ 726/13 |
| 7,424,025 | B2 | 9/2008 | Qian et al. |
| 2002/0138599 | A1 | 9/2002 | Dilman et al. |
| 2002/0138643 | A1 | 9/2002 | Shin et al. |
| 2003/0041146 | A1 | 2/2003 | Davis et al. |
| 2004/0215976 | A1 | 10/2004 | Jain |
| 2004/0250124 | A1 * | 12/2004 | Chesla et al. ............. 713/201 |
| 2005/0007954 | A1 | 1/2005 | Sreemanthula et al. |
| 2005/0076138 | A1 * | 4/2005 | Sterne ...................... 709/238 |
| 2005/0111382 | A1 | 5/2005 | Le et al. |

OTHER PUBLICATIONS

Notification of Transmittal of the International Search Report and the Written Opinion of the International Searching Authority, or the Declaration in International Application No. PCT/US05/35891 (Apr. 26, 2006).

International Search Report and Written Opinion of the International Searching Authority corresponding to PCT application No. PCT/US05/35890 dated Jul. 20, 2006.

* cited by examiner

Primary Examiner—Kimyen Vu
Assistant Examiner—Suman Debnath
(74) Attorney, Agent, or Firm—Jenkins, Wilson, Taylor & Hunt, P.A.

(57) ABSTRACT

Methods and systems for automatic denial of service protection in an IP device are disclosed. Packets are received at a network interface of an IP device, the packets being addressed to a network address of the network interface. The packets addressed to the network interface of the IP device are forwarded to a processor in the IP device. The processor determines whether the packets violate a rate-based policing policy of the IP device. In response to determining that the packets violate the rate-based policing policy, source identifying information associated with the packets is added to an access control list in the IP device. Packets matching criteria in the access control list are prevented from being forwarded to the processor in the IP device.

27 Claims, 8 Drawing Sheets

METHODS AND SYSTEMS FOR AUTOMATIC DENIAL OF SERVICE PROTECTION IN AN IP DEVICE

RELATED APPLICATIONS

This application claims the benefit of U.S. Provisional Application No. 60/616,651 entitled "Media Gateway Features", filed Oct. 7, 2004, the disclosure of which is incorporated herein by reference in its entirety.

TECHNICAL FIELD

The subject matter described herein relates to communications and more particularly to automatic denial of service protection in an IP device.

BACKGROUND

In modern telephony networks, media switching and call control functionality are separated. Call control, which includes setting up and tearing down calls and maintaining call state machines, is performed by a network entity referred to as a media gateway controller (MGC). Media stream switching, which includes switching media packets between input and output ports and converting the media packets into the appropriate formats for the sending and receiving parties, is performed by a media gateway (MG). Media gateway controllers communicate call control information to media gateways via a media gateway control protocol.

Typical media gateway control protocols, such as MGCP and MEGACO, include commands for communicating information about each endpoint of a session to the media gateway and instructing the media gateway as to how to process packets to be delivered to each endpoint.

FIG. 1 is a schematic diagram illustrating voice sessions between media gateways 100, 102, 104, and 106 interconnected through an IP network 108. Media gateways 100, 102, 104, and 106 may be connected through IP network 108 via multiple paths through a series of next-hop routers. Multiple bidirectional voice sessions may be set up between any two or more of media gateways 100, 102, 104, and 106. As voice packets are received at a media gateway (ingress packets) or exit the media gateway (egress packets), the particular session that a packet belongs to must be identified for proper delivery and/or processing of the packet. The process of assigning a packet to a particular session to which it belongs is commonly referred to as packet classification.

FIG. 2 is a schematic diagram illustrating an exemplary media gateway 200. Referring to FIG. 2, media gateway 200 includes a control manager 202, a resource manager 204, a packet switch fabric 206, voice servers 208, and network interfaces 210. Each voice server 208 contains voice processing resources for processing VoIP and TDM voice streams.

For example, each voice server 208 may include codecs, VoIP, ATM, and TDM chips, and digital signal processing resources for processing VoIP streams. A detailed description of exemplary resources that may be found in voice server 208 can be found in commonly assigned, co-pending U.S. patent application Ser. No. 10/676,233, the disclosure of which is incorporated herein by reference in its entirety.

Control manager 202 of media gateway 200 controls the overall operation of media gateway 200 and communicates with media gateway controller 212 to set up and tear down calls. Resource manager 204 of control manager 202 allocates new voice sessions to incoming calls. For example, resource manager 204 may assign one of voice servers 208 to a session and store session information for the session in a session table 214 in a memory. Session table 214 is then regularly accessed to classify ingress and egress packets to the appropriate sessions. Although session table 214 is shown logically as a single entity, session tables 214 may actually be distributed among, and accessed by, network interfaces 210, as will be discussed further below.

Voice servers 208 are each assigned individual IP addresses and are each reachable through packet switch fabric 206 via any of network interfaces 210. Multiple sessions may be processed by the same voice server 208. Furthermore, multiple sessions may be established between a given network interface 210 and a given voice server 208 through the packet switch fabric 206. Network interfaces 210 are also each assigned individual IP addresses. The traffic rate for a given voice server 208 or network interface 210 should not be exceeded to avoid degrading the voice quality of calls, or worse, overloading the media gateway 200.

A denial of service attack may be launched against media gateway 200 by flooding the media gateway with packets, thereby reducing the call handling capacity, or even overloading the media gateway 200. For example, a flood of packets addressed to a network interface 210 may be received from a source, such as a computer operated by malicious attacker with the goal of impairing media gateway 200. Conventionally, such attacks results in a temporary impairment or disabling of media gateway 200 until the source can be blocked by a network operator determining the source and manually adding the source to an access control list (ACL) to deny access to the source and prevent against future attacks. It would be advantageous to automatically detect excessive IP traffic from a source IP address or addresses and dynamically update an ACL and with the source IP address. Such capabilities, however, do not exist in current media gateway architectures.

Accordingly, a need exists for automatic denial of service protection in a media gateway.

SUMMARY

In one aspect of the subject matter disclosed herein, a method is disclosed for automatic denial of service protection in an IP device. Packets are received at a network interface of an IP device. The packets addressed to the network interface of the IP device are forwarded to a processor in the IP device. The processor determines whether the packets violate a rate-based policing policy of the IP device. In response to determining that the packets violate the rate-based policing policy, source identifying information associated with the packets is added to an access control list in the IP device. Packets matching criteria in the access control list are prevented from being forwarded to the processor in the IP device.

As used herein, an IP device may include, but is not limited to, a VoIP device, such as a media gateway or VoIP terminal, or a non-VoIP device, such as an IP router.

In another aspect of the subject matter disclosed herein, a system is disclosed for automatic denial of service protection in an IP device. The system includes a network interface for receiving packets at an IP device, the packets being addressed to a network address of the network interface. A processor in the IP device receives the packets from the network interface and determines whether the packets violate a rate-based policing policy of the IP device. The processor is adapted to add source identifying information associated with the packets to an access control list in the IP device in response to determining that the packets violate the rate-based policing policy. The network interface is adapted to prevent packets matching criteria in the access control list from being forwarded to the processor in the IP device.

In yet another aspect of the subject matter disclosed herein, a media gateway having automatic denial of service protection is disclosed. The media gateway includes a plurality of network interfaces for receiving packets, including packets being addressed to any of the network interfaces. The media gateway also includes a control manager for receiving the packets addressed to any of the network interfaces from the network interfaces and for determining whether the packets violate a rate-based policing policy of the media gateway. The control manager includes logic configured to add source identifying information associated with the packets to an access control list in the media gateway in response to determining that the packets violate the rate-based policing policy. The network interfaces are adapted to prevent packets matching criteria in the access control list from being forwarded to the control manager.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION OF THE INVENTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Thus, the subject matter disclosed can be embodied in many different forms, and all such forms are contemplated to be within the scope of what is claimed. Any such form of embodiment can be referred to herein as "logic configured to" perform a described action.

Figure 1:
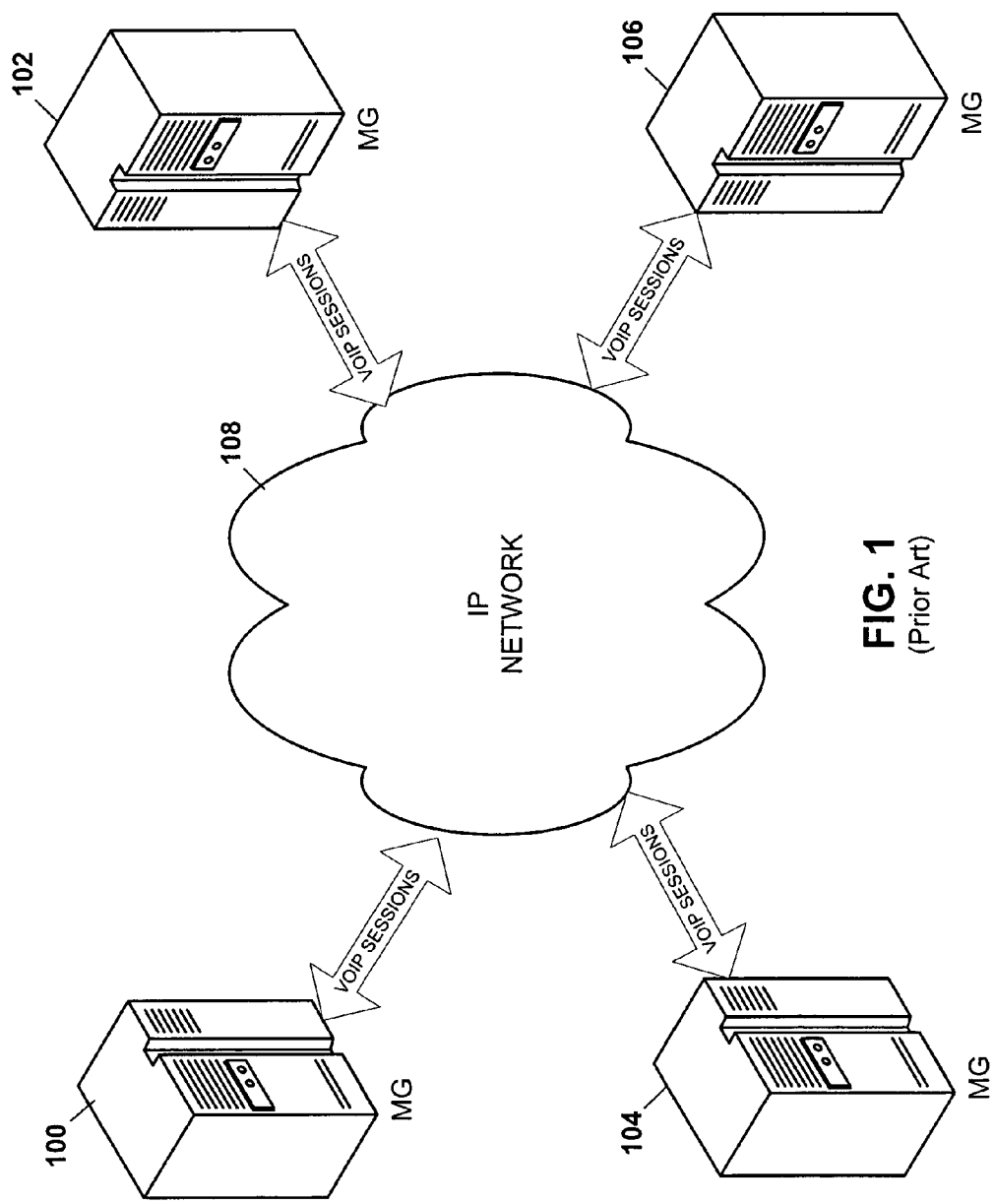
FIG. 1 is a schematic diagram illustrating voice sessions between media gateways interconnected through an IP network.
Figure 2:
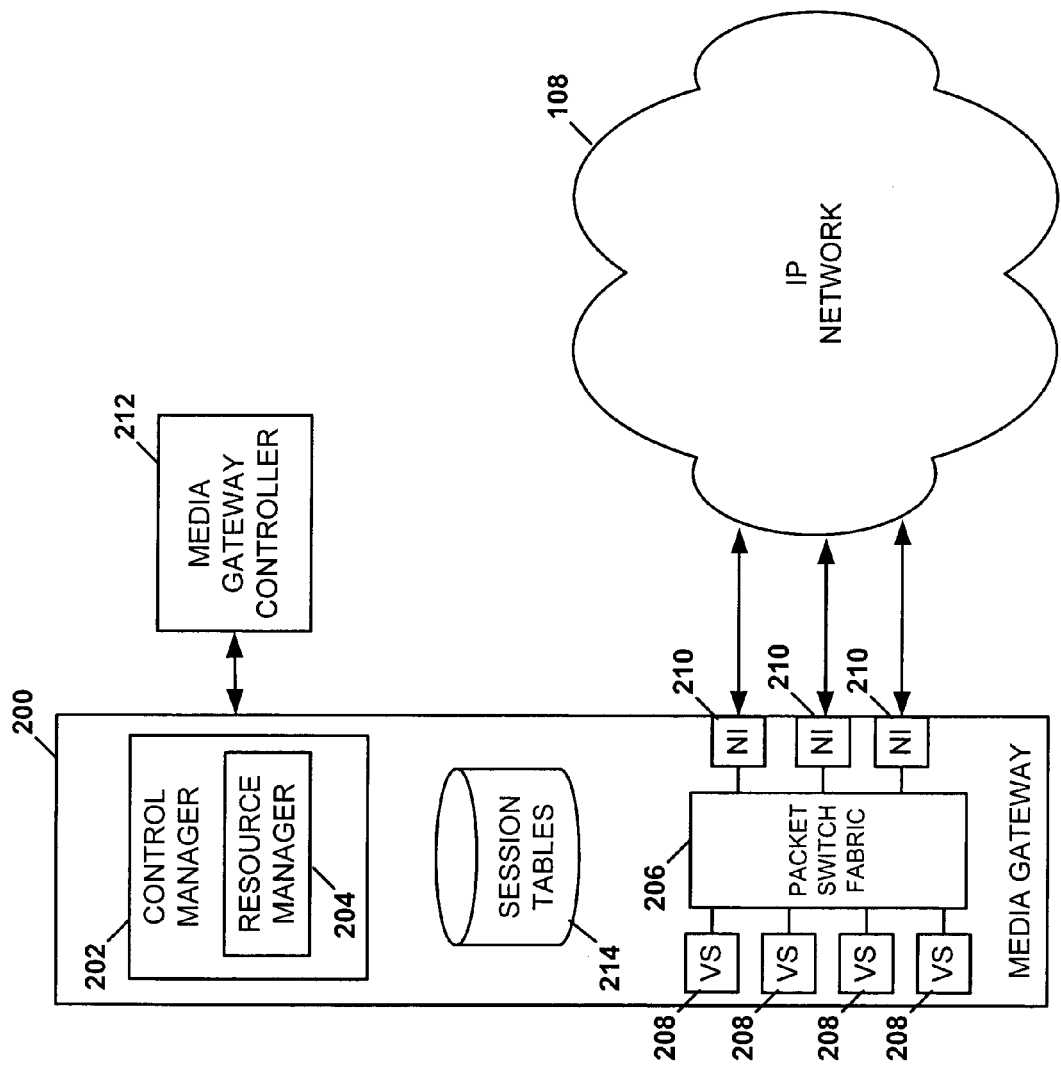
FIG. 2 is a schematic diagram illustrating an exemplary media gateway.
Figure 3:
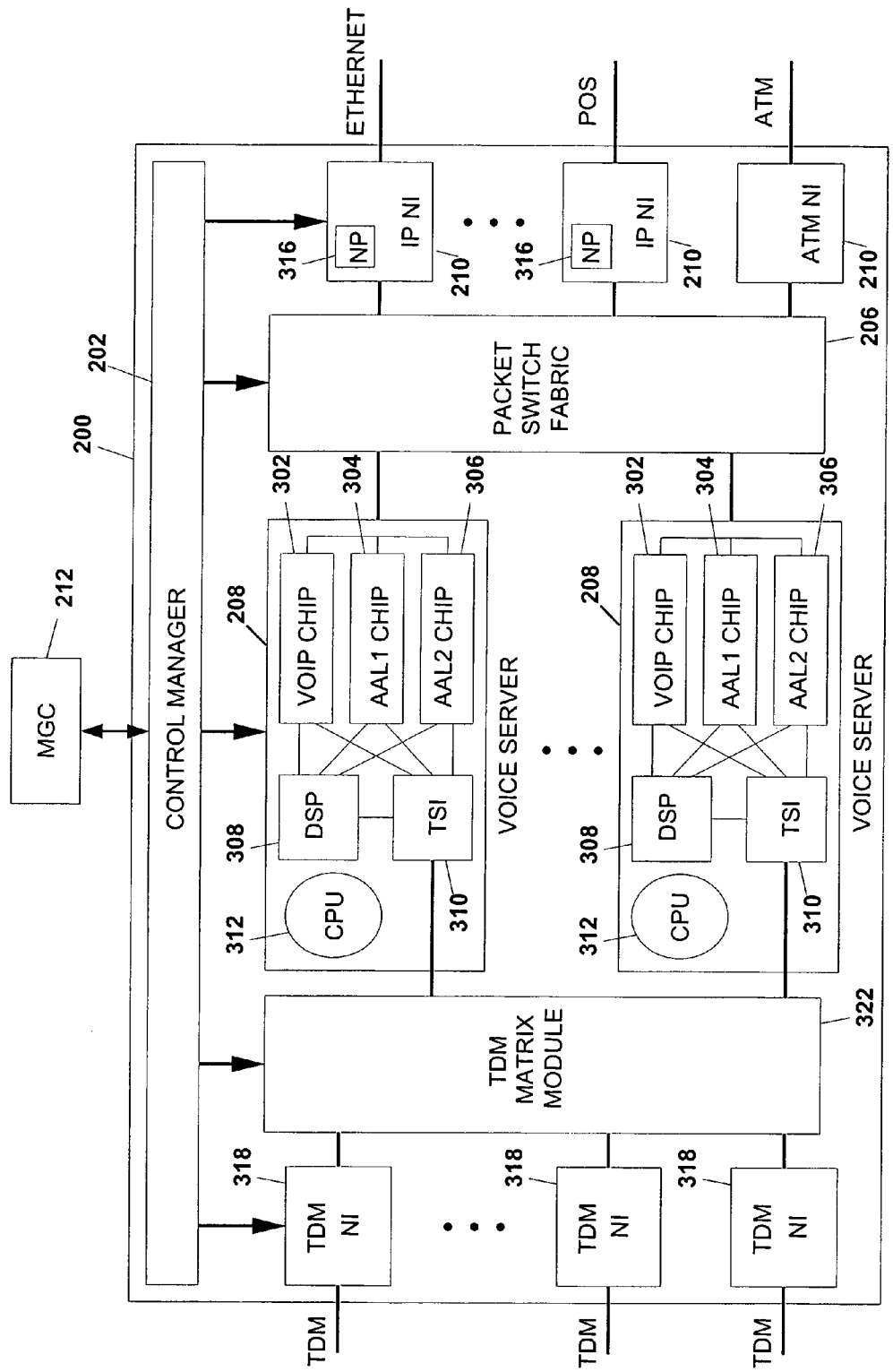
FIG. 3 is a schematic diagram illustrating an exemplary internal architecture for a media gateway.

FIG. 3 is a schematic diagram illustrating an exemplary internal architecture for media gateway 200 in more detail. Although a media gateway is described herein by way of example, it should be understood that the methods and systems disclosed herein may be applied to any VoIP or IP device, such as an IP switch or router device. In FIG. 3, media gateway 200 includes voice servers 208, which include various voice chips, including VoIP chips 302, voice-over-AAL1 chips 304, and voice-over-AAL2 chips 306. In addition, each voice server 208 includes some digital signal processors 308 (e.g. voice transcoders, echo cancellers, conference bridges, etc.), a time slot interconnection (TSI) 310, and a central processing unit (CPU) 312.

In the illustrated example, each voice chip 302 implements one or more VoIP protocols, such as Real time Transmission Protocol (RTP). Each voice chip 304 implements ATM Adaptation Layer 1 (AAL1) functions. Each voice chip 306 implements ATM Adaptation Layer 2 (AAL2) functions. DSP 308 provides transcoding, echo cancellation and other payload-transformation functions. TSI 310 makes on-demand connections between VoIP chip channels, TDM matrix channels, and DSPs. CPU 312 controls the overall operation of each voice server 208.

In addition to voice servers 208, media gateway 200 includes a plurality of network interfaces 210. Each network interface 210 implements network layer functions and packet forwarding functions, such as IP forwarding functions. In the illustrated example, different network interfaces are provided to connect to external Ethernet, Packet-Over-SONET (POS), ATM, and MPLS networks.

In addition to packet-based network interfaces 210, media gateway 200 may also include TDM network interfaces 318. TDM network interfaces 318 send and receive voice frames from external TDM networks. TDM network interfaces 318 may implement any suitable physical layer protocols for sending and receiving voice frames over TDM links. For example, each TDM network interface 318 may terminate one or more TDM voice trunks.

In order to switch media packets between network interfaces 210 and voice servers 208, media gateway 200 includes a packet switch fabric 206. Packet switch fabric 206 routes packets between voice servers 208 and network interfaces 210 under the control of control manager 202. As discussed above, packet switch fabric 206 may connect every network interface 210 to every voice server 208. In addition to packet switch fabric 206, gateway 200 may also include a TDM matrix module 322 for switching traffic that is carried in each TDM timeslot. TDM matrix module 322 is also controlled by control manager 320. Control manager 202 may communicate with media gateway controller 212 to dynamically allocate logical and physical resources for each session.

In operation, control manager 202 receives a request for a new call/session. The request may be generated by media gateway controller 212 in response to a call setup message associated with a new call. The call setup message may be an ISUP IAM message, a PRI SETUP message, a SIP INVITE message, or any other suitable type of call setup message for initiating a call. Control manager 202 assigns a voice server 208 and a voice chip to process the media stream for the session. Control manager 202 also identifies the session with an entry in a session table 214. The session identifier includes a combination of IP addresses and UDP port numbers that is unique among current sessions. The session is preferably assigned to a voice chip for the duration of the session and is communicated to the remote end of a session by media gateway controller 212. The remote end of the session will then send subsequent media stream packets that are addressed according to the session identifier. Session tables 214 on each network interface 210 are updated under the control of control manager 202 so that packets addressed according to the session identifier are forwarded to the appropriate voice chip.

Once resources, such as a voice chip, have been assigned to the session, media gateway 200 classifies packets having the same session identifier to the session. That is, packets are forwarded via the switch fabric 206 to and from the voice chip assigned to the session for voice processing. Exemplary operations that may be performed by the assigned voice chip may include segmentation and reassembly (SAR), echo cancellation, transcoding, DTMF detection, DTMF generation, announcement, conference bridging, Internet Fax, and law enforcement. Once the voice packets associated with the session have been processed, the voice packets may be sent from the voice chip to one of network interface 210 or to a TDM network interface 318 for transmission to the remote end of a session. Once a session ends, the resources used may be assigned to a new session. An exemplary method for dynamically assigning resources to sessions suitable for use with the methods and systems described herein is described in commonly assigned, co-pending U.S. patent application Ser. No. 10/676,233, referenced above.

A malicious attacker can flood one or more network interfaces 210 with excessive traffic in a denial of service attack. If such traffic is not timely blocked, media gateway 200 may be forced out of service. For example, a network user can flood a given network interface with PING (Packet INternet Groper) packets each having a network interface IP address as the destination address. PING is an Internet utility used to determine whether a particular IP address is functioning by sending out a packet and waiting for a response. PING is most commonly used to test and debug a network. A flood of PING packets can be generated rapidly from a remote source directed to one or more network interfaces 210. Alternatively, a malicious attacker may flood network interfaces 210 with routing protocol packets, such as open shortest path first (OSPF) packets, which are used to determine the best path for routing IP traffic in a TCP/IP network based on distance between nodes and quality parameters. As will be appreciated by one of ordinary skill in this art, many of types of protocol packets may be employed. These packets are not carrying voice data for a session and an unusually high receipt of such packets from a single source is an indicator that a denial of service attack is occurring. Regardless of the type of packet employed, each packet will include source information that indicates the remote source that is sending the packet. For example, an IP packet will contain a source IP address. When one of network interfaces 210 receive a packet that is addressed to them, as determined by analyzing the destination address of the packet, network interfaces 210 will typically forward the packet to control manager 202 of media gateway 200 for processing. As can be appreciated, during a denial of service attack, control manager 202 may exhaust its resources attempting to process the flood of packets, thus forcing media gateway 200 out of service. For example, suppose a malicious attacker floods media gateway 200 with packets addressed to all of network interfaces 210 repeatedly from a remote source. Control manager 202 would then receive the aggregate of all packets for processing, which could result in overwhelming control manager 202 and thus forcing media gateway 200 out of service.

Figure 4:
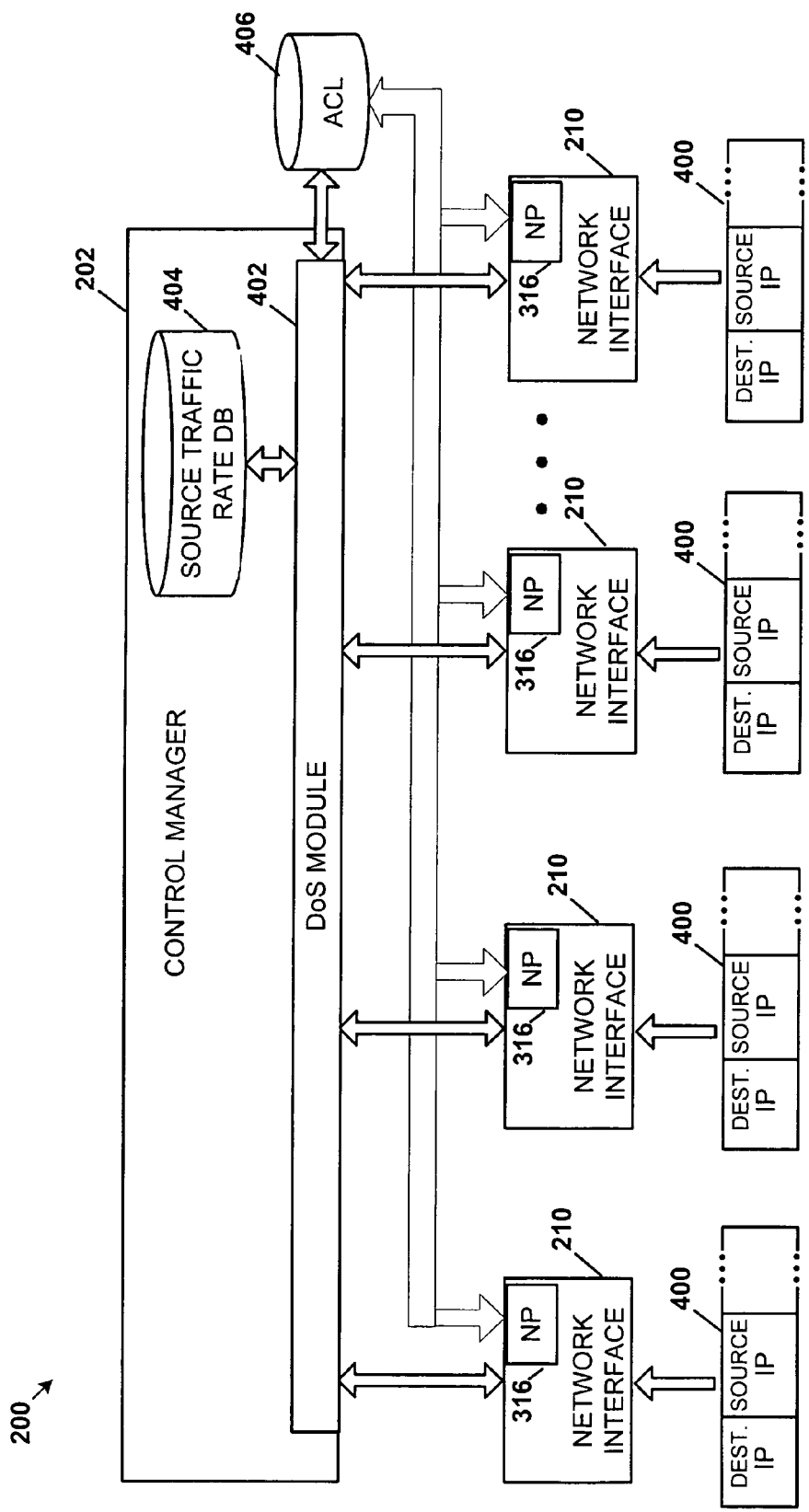
FIG. 4 is a schematic diagram illustrating a system for automatic denial of service protection in an IP device according to an aspect of the subject matter described herein.

FIG. 4 is a schematic diagram illustrating a system for automatic denial of service protection in an IP device according to an aspect of the subject matter described herein. Media gateway 200 is shown as the IP device by way of example, but the system of FIG. 4 can be employed in any IP device. In FIG. 4, packets 400 are received and network interfaces 210. Packets 400 that are determined by network processor 316 to be addressed to network interface 210 are forwarded to control manager 202 where they are analyzed by a denial of service (DoS) module 402 to determine the source identifier, such as a source IP address. DoS module 402 may be, for example, a processor that monitors a traffic rate from each source IP address and maintains traffic rate information for each source in a source traffic rate database 404. For example, in one implementation each time a packet 400 addressed to one of network interfaces 210 is forwarded to control manager 202, an entry is recorded in source traffic rate database 404 that includes a source identifier and a time stamp indicating when the packet is received. To determine a traffic rate for a given source, the number of entries having the source identifier and a time stamp within and given time period are counted. For example, if 100 packets are received from a given source IP address having a time stamp within the last one second, then the traffic rate for that source is currently 100 packets per second. The traffic rate may then be compared to a maximum allowable source traffic rate threshold value to determine if the source has exceeded the threshold, thus indicating the likelihood of a denial of service attack from the source.

If the traffic rate exceeds the maximum allowable source traffic rate threshold, DoS module 402 adds or updates a record in an access control list (ACL) 406. ACL 406 includes a list of sources that should be blocked from accessing media gateway 200 due to denial of service concerns. Accordingly, when additional packets 400 are received from the source at network interface 210, a respective network processor 316 of network interface 210 checks with ACL 406 to determine if the source identifier of the packet 400 is listed therein. If the source is listed in ACL 406, the packet is prevented from reaching control manager 202 and unnecessarily using the resources of media gateway 200. For example, network interface 210 can discard packets having source identifiers listed in ACL 406. ACL 406 can thus be considered to include a rate-based policing policy that is implemented by network processors 316 and control manager 202.

ACL 406 may be stored in a memory in media gateway 200 associated with control manager 202 and/or associated with each network interface 210. In an exemplary implementation, ACL 406 is stored and maintained on both control manager 202 and each network interface 210.

ACL 406 may be operator-editable. That is, ACL 406 may be accessible to a network operator, either locally or remotely, for purposes of editing ACL 406, such as for adding and removing source identifiers from the list. Alternatively, or in addition, source identifying information may be removed automatically from ACL 406 according to any of a number of established procedures. For example, ACL 406 may optionally also include date and time information for each entry along with the source identifying information. When an entry containing a source identifier from which packets addressed to the interface 210 have not been received at network interface 210 for a predetermined period of time, the entry is automatically removed from ACL 406.

In order to determine whether packets having a source identifier listed in ACL 406 have not been received for the predetermined period of time without forwarding every packet to control manager 202 for processing, control manager 202 may instruct network interfaces 210 to forward a sampling of received packets having the source identifier. For example, when a respective network processor 316 of network interface 210 checks ACL 406 and determines that a received packet has a source identifier listed in ACL 406, network processor 316 tracks how many packets have been received from the ACL-listed source for purposes of forwarding only a sampling, such as one packet for every hundred packets, to control manager 202. This way, control manager 202 is able to ascertain whether a predetermined period of time has expired for purposes of removing an entry from the ACL list without having to process each and every packet received. For example, counters may be maintained in a memory (not shown) that is either internal or external to network processor 316 for the purposes of tracking how many packets have been received from the ACL-listed source.

Figure 5:
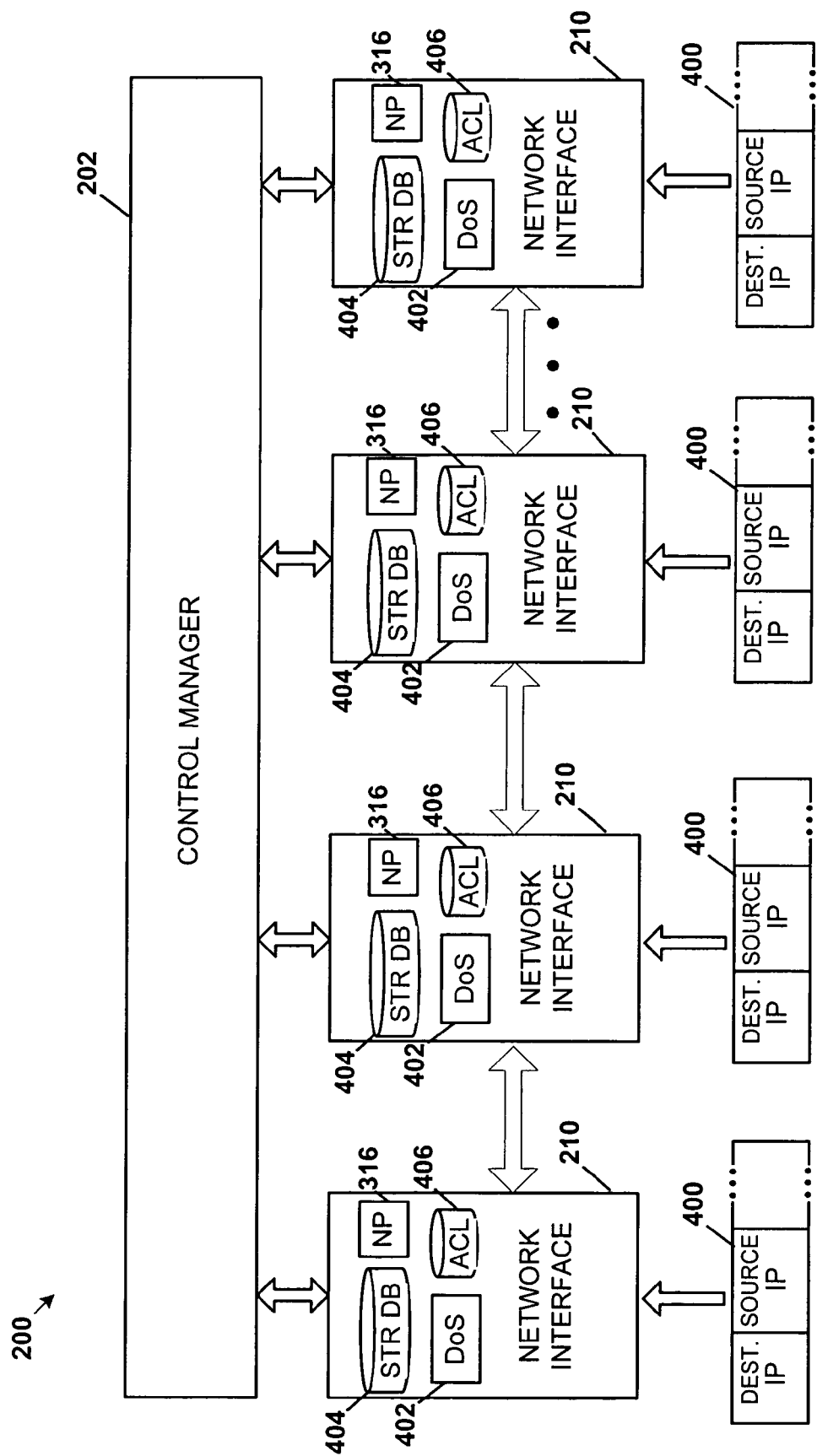
FIG. 5 is a schematic diagram illustrating a system for automatic denial of service protection in an IP device according to another aspect of the subject matter described herein.

FIG. 5 is a schematic diagram illustrating a system for automatic denial of service protection in an IP device according to another aspect of the subject matter described herein. In FIG. 5, each network interface 210 includes DoS module 402, source traffic rate database 404 and ACL 406. One or more of these functions may be incorporated into network processor 316. Packets 400 are received at network interfaces 210 and are analyzed by DoS module 402 prior to forwarding the packets 400 to control manager 202 to determine the source identifier, such as a source IP address. DoS module 402 monitors traffic rates from each source IP address and maintains traffic rate information for each source in source traffic rate database 404 as described above. If the traffic rate from a given source exceeds the maximum allowable source traffic rate threshold, DoS module 402 adds to or updates the list of blocked sources in ACL 406 for the network interface 210. In a preferred implementation, where more than one network interface 210 is employed, network interfaces 210 share information, such as ACL 406 information and/or source traffic rate database 404 information, to maintain cumulative information from multiple network interfaces 210 in each network interface 210 for better denial of service decision-making. In either case, when additional packets 400 are received from the source at network interface 210, network processor 316 of network interface 210 checks with ACL 406 to determine if the source identifier of the packet 400 is listed therein. If the source is listed in ACL 406, the packet is prevented from reaching control manager 202 and unnecessarily using the resources of media gateway 200.

DoS module 402 may optionally also remove entries from ACL 406 that contain a source identifier from which packets addressed to the interface 210 have not been received at network interface 210 for a predetermined period of time. In this case however, it is not necessary to sample packets to control manager 202 as described above, since DoS module 402 is located at network interface 210.

Figure 6:
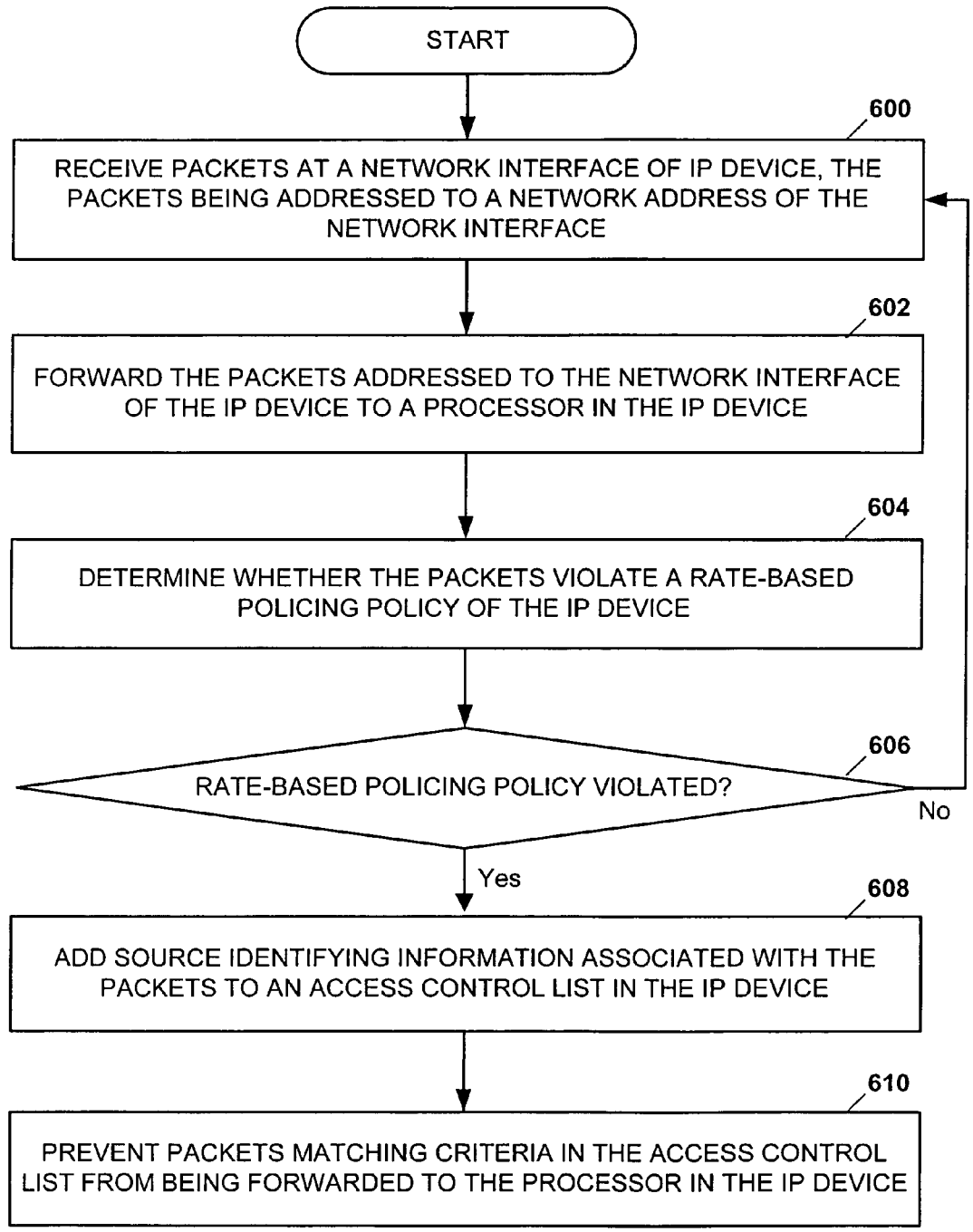
FIG. 6 is a flow chart illustrating a method for automatic denial of service protection in an IP device according to an aspect of the subject matter disclosed herein.

FIG. 6 is a flow chart illustrating a method for automatic denial of service protection in an IP device according to an aspect of the subject matter disclosed herein. In FIG. 6, packets addressed to a network address of the network interface are received at a network interface of an IP device in step 600. In step 602, the packets addressed to the network interface of the IP device are forwarded to a processor in the IP device, such as DoS module 402. The processor determines whether the packets violate a rate-based policing policy of the IP device in step 604. In response to the processor determining in step 604 that the packets violate the rate-based policing policy, the processor decides in step 606 to add source identifying information associated with the packets to an access control list in the IP device in step 608. In step 610; packets matching criteria in the access control list are prevented from being forwarded to the processor in the IP device. If, in step 604, the processor determines that the packets do not violate the rate-based policing policy, control moves through step 606 back to step 600.

Figure 7:
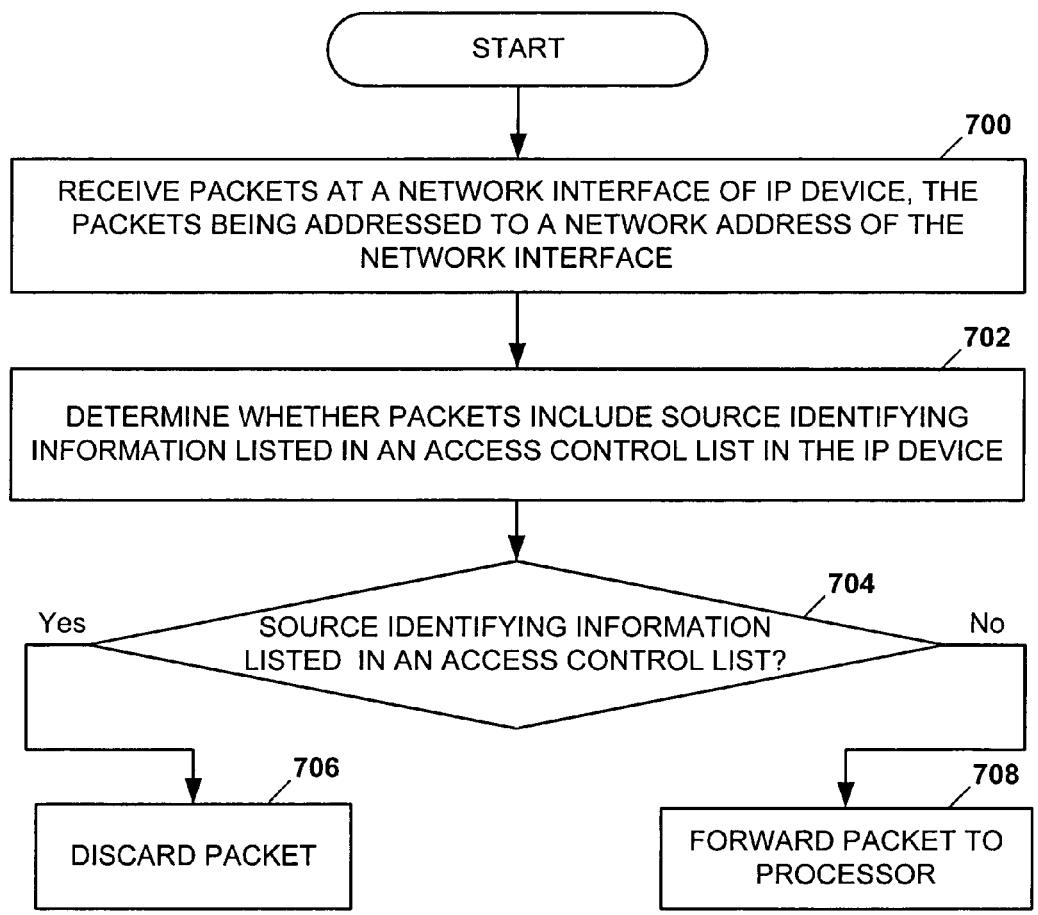
FIG. 7 is a flow chart illustrating a method for preventing packets from being forwarded to the processor in an IP device for automatic denial of service protection in the IP device according to an aspect of the subject matter disclosed herein.

FIG. 7 is a flow chart illustrating a method for preventing packets from being forwarded to the processor in an IP device for automatic denial of service protection in the IP device according to an aspect of the subject matter disclosed herein. In FIG. 7, packets addressed to a network address of network interface 210 are received at network interface 210 of an IP device 200 in step 700. In step 702, network processor 316 of network interface 210 determines whether the packets include source identifying information listed in ACL 406. If network processor 316 determines in step 704 that source identifying information is listed in ACL 406, the packet is discarded in step 706. In response to determining in step 704 that source identifying information is not listed in ACL 406, the packet is forwarded to the processor, e.g., control manager 202, in step 708.

Figure 8:
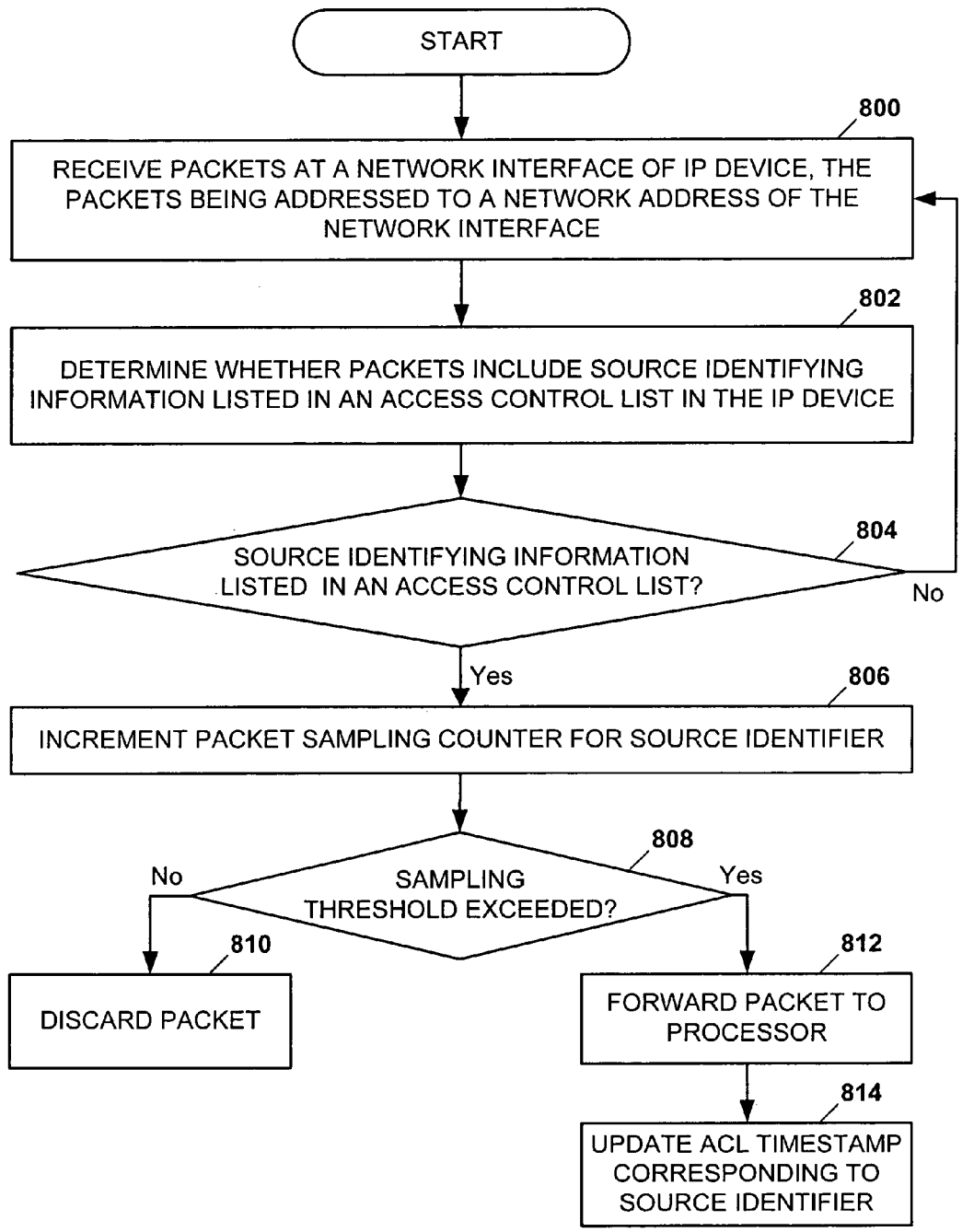
FIG. 8 is a flow chart illustrating a method for preventing packets from being forwarded to the processor in an IP device for automatic denial of service protection in the IP device according to another aspect of the subject matter disclosed herein.

FIG. 8 is a flow chart illustrating a method for preventing packets from being forwarded to the processor in an IP device for automatic denial of service protection in the IP device according to another aspect of the subject matter disclosed herein. In FIG. 8, packets addressed to a network address of network interface 210 are received at network interface 210 of an IP device 200 in step 800. In step 802, network processor 316 of network interface 210 determines whether the packets include source identifying information listed in ACL 406. If network processor 316 determines in step 804 that source identifying information is listed in ACL 406, a packet sampling counter for the source identifier is incremented in step 806. In step 808, network processor 316 determines whether a sampling threshold for the source identifier is exceeded. In response to determining that the sampling threshold is not exceeded in step 808, the packet is discarded in step 810. In response to determining that the sampling threshold is exceeded in step 808, the packet is forwarded to the processor, e.g., control manager 202, in step 812 and the time stamp corresponding to the source identifier in ACL 406 is updated in step 814.

Additional steps may be taken regarding the information included in ACL 406. For example, ACL 406 may be read periodically and copied into another, more permanent, memory for maintaining information regarding denial of service attacks and their sources. In this way, patterns of denial of service attacks can be examined and repeat-offender sources can be discovered and investigated further.

Once again, it should be understood that although a media gateway is used herein by way of example, the methods and systems disclosed herein may be employed with any IP device, such as an IP switch and/or router.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for automatic denial of service protection in a media gateway, the method comprising:
   (a) receiving packets at a network interface of a media gateway, the packets being addressed to a network address of the network interface;
   (b) forwarding the packets addressed to the network address of the network interface of the media gateway to a processor in the media gateway;
   (c) at the processor, determining whether any of the packets addressed to the network address of the network interface violate a rate-based policing policy of the media gateway;
   (d) adding source identifying information associated with the packets that are determined to violate the rate-based policing policy to an access control list in the media gateway;
   (e) preventing at least some packets matching criteria in the access control list from being forwarded to the processor in the media gateway; and
   (f) forwarding a sampling of the packets matching criteria in the access control list to the processor in the media gateway and determining whether to remove an entry from the access control list based on the sampled packets.

2. The method of claim 1 wherein receiving packets at a network interface of media gateway comprises receiving IP packets having a destination IP address matching an IP address of the network interface.

3. The method of claim 1 wherein determining whether the packets violate a rate-based policing policy of the media gateway comprises:
   (a) monitoring a traffic rate of packets received from a source;
   (b) comparing the monitored traffic rate to a threshold; and
   (c) determining based on the comparison whether the rate-based policing policy of the media gateway is violated.

4. The method of claim 3 wherein monitoring a traffic rate of packets received from a source comprises:
   (a) determining source identifying information from the received packets; and
   (b) tracking a number of packets received over a predetermined time period that have same source identifying information.

5. The method of claim 4 wherein tracking a number of packets received over a predetermined time period comprises:
   (a) recording an entry in a source traffic rate database that includes the source identifying information and a time of receipt for each packet received; and
   (b) counting a number of entries having same source identifying information and having time of receipt information indicating receipt within the predetermined time period.

6. The method of claim 1 wherein adding source identifying information associated with the packets to an access control list in the media gateway comprises recording an entry in the access control list that includes the source identifying information and corresponding time of recording information.

7. The method of claim 6 comprising removing the recorded entry from the access control list after a predetermined period of time has elapsed beyond a time indicated in the corresponding time of recording information.

8. The method of claim 6 comprising updating the corresponding time of recording information in the recorded entry of the access control list when new packets matching the source identifying information are received.

9. The method of claim 1 wherein preventing packets matching criteria in the access control list from being forwarded to the processor in the media gateway comprises:
   (a) determining whether a packet includes source identifying information listed in the access control list in the media gateway; and
   (b) in response to determining that the packet includes source identifying information listed in the access control list, discarding the packet.

10. The method of claim 1 wherein preventing packets matching criteria in the access control list from being forwarded to the processor in the media gateway comprises:
    (a) determining whether received packets include source identifying information listed in the access control list in the media gateway; and
    (b) in response to determining that the packets include source identifying information listed in the access control list, forwarding a sampling of the packets to the processor.

11. The method of claim 1 wherein the access control list in the media gateway is operator-editable.

12. The method of claim 1 further comprising automatically removing the source identifying information associated with the packets from the access control list in the media gateway.

13. The method of claim 6 comprising deriving statistical information from entries in the access control list based on at least one of recorded source identification information and corresponding time of recording information.

14. A system for automatic denial of service protection in a media gateway, the system comprising:
    (a) a network interface for receiving packets at media gateway, the packets being addressed to a network address of the network interface;
    (b) a processor in the media gateway for receiving the packets from the network interface that are addressed to the network address of the network interface and for determining whether any of the packets that are addressed to the network address of the network interface violate a rate-based policing policy of the media gateway, the processor including logic configured to add source identifying information associated with the packets that are determined to violate the rate based policing policy to an access control list in the media gateway, and wherein the network interface is adapted to prevent at least some packets matching criteria in the access control list from being forwarded to the processor in the media gateway and to forward a sampling of the packets matching criteria in the access control list to the processor in the media gateway and wherein the processor is configured to determine whether to remove an entry from the access control list based on the sampled packets.

15. The system of claim 14 wherein the network interface of the media gateway comprises logic configured to receive IP packets having a destination IP address matching an IP address of the network interface.

16. The system of claim 14 wherein the media gateway comprises logic configured to:
 (a) monitor a traffic rate of packets received from a source;
 (b) compare the monitored traffic rate to a threshold;
 (c) determine based on the comparison whether the rate-based policing policy of the media gateway is violated.

17. The system of claim 16 wherein the processor comprises logic configured to:
 (a) determine source identifying information from the received packets;
 (b) track a number of packets received over a predetermined time period that have same source identifying information.

18. The system of claim 17 wherein the media gateway comprises logic configured to:
 (a) record an entry in a source traffic rate database that includes the source identifying information and a time of receipt for each packet received;
 (b) count the number of entries having same source identifying information and having time of receipt information indicating receipt within the predetermined time period.

19. The system of claim 14 wherein the media gateway comprises logic configured to record an entry in the access control list that includes the source identifying information and corresponding time of recording information.

20. The system of claim 19 wherein the media gateway comprises logic configured to remove the recorded entry from the access control list after a predetermined period of time has elapsed beyond a time indicated in the corresponding time of recording information.

21. The system of claim 19 wherein the media gateway comprises logic configured to update the corresponding time of recording information in the recorded entry of the access control list when new packets matching the source identifying information are received.

22. The system of claim 14 wherein the media gateway comprises logic configured to:
 (a) determine whether a packet includes source identifying information listed in the access control list in the media gateway; and
 (b) in response to determining that the packet includes source identifying information listed in the access control list, discard the packet.

23. The system of claim 14 wherein the media gateway comprises logic configured to:
 (a) determine whether received packets include source identifying information listed in the access control list in the media gateway; and
 (b) in response to determining that the packets include source identifying information listed in the access control list, forward a sampling of the packets to the processor.

24. The system of claim 14 wherein the access control list in the media gateway is operator-editable.

25. The system of claim 14 wherein the media gateway comprises logic configured to automatically remove the source identifying information associated with the packets from the access control list in the media gateway.

26. The system of claim 14 comprising logic configured to derive statistical information from the entries in the access control list based on at least one of recorded source identification information and corresponding time of recording information.

27. A media gateway having automatic denial of service protection, the media gateway comprising:
 (a) a plurality of network interfaces for receiving packets, the packets being addressed to any of the network interfaces; and
 (b) a control manager for receiving the packets addressed to any of the network interfaces from the network interfaces and for determining whether any of the packets addressed to the network interfaces violate a rate-based policing policy of the media gateway, the control manager including logic configured to add source identifying information associated with the packets determined to violate the rate based policy to an access control list in the media gateway, and
 wherein the network interfaces are adapted to prevent at least some packets matching criteria in the access control list from being forwarded to the control manager and to forward a sampling of the packets matching criteria in the access control list to the control manager in the media gateway and wherein the control manager is configured to determine whether to remove an entry from the access control list based on the sampled packets.

* * * * *